(12) United States Patent
Ma

(10) Patent No.: US 6,533,084 B2
(45) Date of Patent: Mar. 18, 2003

(54) GAS SPRING DEVICE

(75) Inventor: Dong Kwan Ma, Kyonggi-Do (KR)

(73) Assignee: Samhongsa Co., Ltd., Seoul (KR)

( * ) Notice: Subject to any disclaimer, the term of this patent is extended or adjusted under 35 U.S.C. 154(b) by 0 days.

(21) Appl. No.: 09/849,485

(22) Filed: May 7, 2001

(65) Prior Publication Data

US 2002/0162714 A1 Nov. 7, 2002

(51) Int. Cl.[7] .................................................. F16F 9/00
(52) U.S. Cl. ................. 188/320; 267/64.15; 188/322.15
(58) Field of Search ........................... 267/64.15, 64.11, 267/136; 188/322.15, 322.16, 322.18, 322.22, 317, 320

(56) References Cited

U.S. PATENT DOCUMENTS

| | | | | |
|---|---|---|---|---|
| 4,132,395 A | * | 1/1979 | Fox, Jr. ..................... | 267/64.15 |
| 4,438,833 A | * | 3/1984 | Schafer ....................... | 188/320 |
| 4,467,899 A | * | 8/1984 | Molders et al. ............. | 188/320 |
| 4,775,038 A | * | 10/1988 | Unnikrishnan et al. ..... | 188/317 |
| 4,989,700 A | * | 2/1991 | Popjoy .................. | 188/322.18 |
| 5,964,454 A | * | 10/1999 | Volpel .................... | 188/322.22 |

\* cited by examiner

*Primary Examiner*—Christopher P. Schwartz
*Assistant Examiner*—Melanie Torres
(74) *Attorney, Agent, or Firm*—McGuireWoods LLP

(57) ABSTRACT

The present invention relates to a speed reducing device of a gas spring device. The piston is slidably moved in the cylinder in the state the piston is adhered to the inner wall surface of the cylinder, and a cutting recess is formed on the outer peripheral surface of the cylinder to easily move the gas in first and second chambers. A concentric gas passage is formed on the surface of the piston which makes contact with the upper washer, and includes another concentric gas passage. An inlet and outlet of the gas passage is opened towards the outer peripheral surface of the piston. A concentric gas passage is formed on the surface of the piston which makes contact with the under washer. The inlet and outlet of the gas passages is opened towards the bottom surface of an annular recess. The gas passage is connected by an axial recess which penetrates the piston.

14 Claims, 8 Drawing Sheets

PRIOR ART

PRIOR ART

GAS SPRING DEVICE

BACKGROUND OF THE INVENTION

1. Field of the Invention

The present invention relates to a gas spring device, and more particularly to an improved gas spring which improves the quality of a speed reducing device.

2. Description of the Prior Art

A gas spring device used in a copier, a vehicle, an industrial device includes a cylindrical chamber having one end closed by a tape holder closed by a flange, a gas seal, and an open holder. The gas cylinder device includes a speed reducing device so that a gas in the cylinder chamber is passed through an axial recess, slidably moving a region of the cylinder chamber. The gas cylinder includes a piston rod having one end connected to the speed reducing device and the other end penetrated through the flange, the gas seal, and the open holder and located outside the cylinder chamber.

Since the gas in the cylinder chamber is higher than the atmospheric pressure, a force which pushes out the piston rod in the chamber and the piston rod is protruded outside.

If the protruded piston rod is pushed inside of the chamber with a force higher than the gas pressure in the chamber, the chamber is separated to two regions and the gas is moved from the chamber having a high pressure to the chamber having a low pressure along the axial recess formed in the speed reducing device.

The gas in the chamber is moved faster when the piston rod is pushed towards into the chamber. The gas in the chamber is moved slower when the pushed piston rod is moved to the original position so that the piston rod is slowly restored.

A speed reducing device of a conventional gas spring is disclosed in Korean Patent No. 84-1891, which will be in detain with reference to FIGS. 2, 3a, and 3b.

FIG. 2 is a cross-section for showing a conventional gas spring device. FIGS. 3a and 3b is a top view for showing a conventional piston. FIG. 3b is a rear view for showing the conventional piston.

The conventional speed reducing device 50 is slidably moved along the inner wall surface of the cylinder 10 As the piston is moved. The speed reducing device comprises a piston 20, upper and under washers 5 and 6 which sandwich the piston. A Teflon® (Teflon®, as used throughout the specification is a registered trademark, and is a synthetic fluorine containing polymer) ring 7 which is mounted to an annular recess 40 formed by the under washer 6 and the piston 20, and an axial recess 8 which penetrates the piston 20.

If the speed reducing device 50 is assumed to move along the A direction, the TEFLON ring 7 is moved towards the upper washer 5 by the friction with the inner wall surface of the cylinder and blocks apertures 30a and 30b through which the gas between the piston 20 and the cylinder 10 is moved. The axial recess is connected to a gas inlet and outlet 8b through a gas passage 8c formed on the upper surface, and is connected to a gas inlet and outlet 8a through a gas passage 8d. The gas inlet and outlets 8a and 8b are always opened so that the gas in the cylinder chamber separated by the speed reducing device is passed to each other. The movement of the gas through the gas inlet and outlets 8a and 8b enlarges the resistance of the flow of the gas and damps the gas flowing speed. The damping degree can be regulated by the number of the axial recess 9 formed along the gas passage 8c and 8d.

Namely, since the TEFLON 7 blocks the apertures 30a and 30b through which the gas between the piston 20 and the cylinder 10 is moved, the gas is moved only through the axial recess 8 and the gas inlet and outlet 8a and 8b to damp the moving speed of the speed reducing device 50 moved towards A direction. The outer diameter of the upper washer 5 is equal to or smaller than the outer diameter of the piston 20. A cutting portion 6a having a size sufficient to pass the gas passing the apertures 30a and 30b is formed in the under washer.

On the other end, if the speed reducing device 50 is moved in the opposite direction of A, the TEFLON ring 7 is moved towards the under washer 6 by the friction with the inner wall surface of the cylinder 10 to open the apertures 30a and 30b between the piston 20 and the cylinder 10. If the TEFLON ring 7 is moved towards the under washer 6, the inner peripheral surface of the TEFLON ring is located in a region of the cutting portion 6a and the gas which moves along the apertures 30a and 30b is easily moved through the cutting portion 6a. Then, since the axial recess 8 is opened, the gas is moved from the gas inlet and outlet 8b to the gas inlet and outlet 8a.

If the apertures 30a and 30b between the cylinder 10 and the piston 20 and the axial recess 8 formed so as to penetrate the piston 20, the function of the speed reducing device is not accomplished.

Another pattern of the gas passage 8c and 8d is disclosed in U.S. Pat. No. 4,438,833, which is shown in FIG. 4.

In the structure of FIG. 4, a gas passage 8c is spirally formed to delay the flow of a gas.

The piston of the speed reducing device having the above-mentioned structure has a width of the aperture which has a predetermined value to move the gas much through the apertures 30a and 30b to reduce the damping reaction of the gas. Further, since the shaking between the piston 20 and the cylinder 10 is severe due to the aperture, the preciseness of the gas shielding due to the Teflon ring is deteriorated and the speed damping preciseness of the gas flow is lowered.

Further, since the gas passages 8c and 8d formed on the surface and the rear surface of the piston is curved or spirally formed, the piston cannot be easily manufactured by the cutting.

SUMMARY OF THE INVENTION

The present invention has been made to solve the above mentioned problem, and accordingly it is an object of the present invention to provide a gas spring device which can improve the quality of a speed reducing device.

In order to achieve the above-mentioned object, the present invention provides a gas spring device which forms a chamber which is filled with a gas at a pressure higher than the atmospheric pressure by closing both ends and includes a piston rod extended towards the inside and the outside of the chamber though one of the both ends of the chamber and a speed reducing device fixed to an end of the piston rod located in the inner side of the chamber to separate the chamber into two spaces through which the filled gas is slowly moved, wherein the speed reducing device includes an uneven piston, an under washer and an upper washer which make contact with upper and lower surfaces of the piston, and a TEFLON ring mounted to an annular recess formed between the piston and the under washer and having an outer peripheral surface adhered to the inner wall surface of the cylinder and an inner peripheral surface separated from the bottom surface of the annular recess, at least one cutting recess formed on the outer peripheral surface of the piston located between the TEFLON ring and the upper washer, at least one speed reducing gas passage formed on the upper and lower surface of the piston, and at least one axial recess penetrating the piston so that the gas passage of the upper and lower surfaces of the piston.

The piston, the piston, the upper washer, the under washer are penetrated and fixed by the piston rod, and the axial recess is formed along a penetrating recess surface of the piston. The under washer has a cross shape.

The Teflon has a circular shape and a portion of the circular shape is cut off.

The piston is comprised one selected from a metal material, a nonmetal material, and a resin material.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENT

Hereinafter, a gas spring device according to the present invention will be explained in detail with reference to FIGS. 1a, 1b, 5a, 5b, 6a, 6b, 7a, and 7b.

Figure 1A:
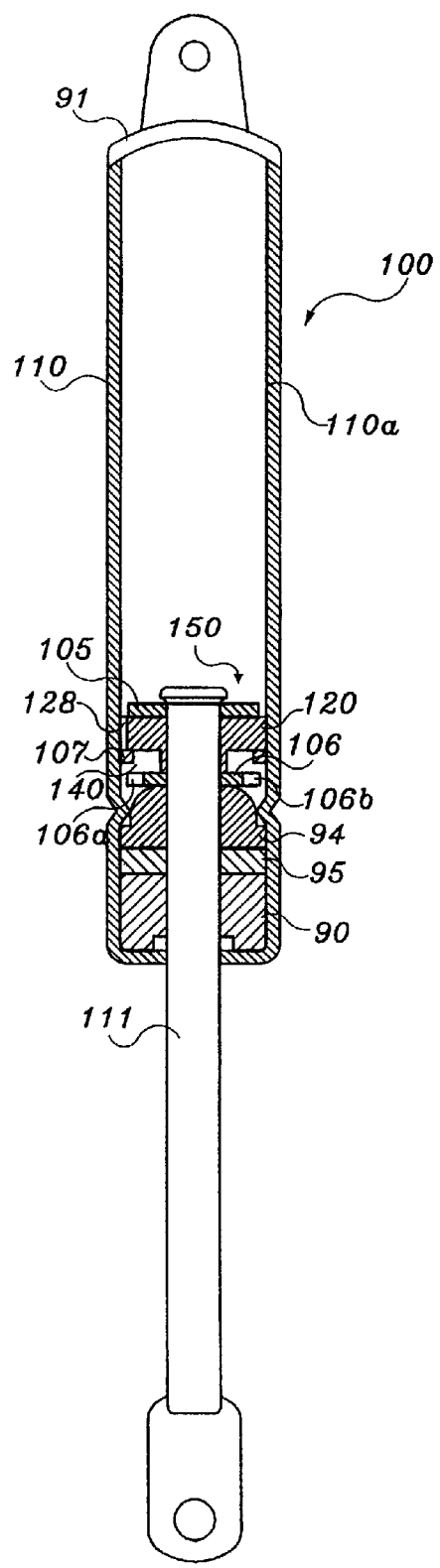
FIG. 1a is a cross-sectional view for showing a gas spring device according to the present invention before a pressure is applied to a piston rod.
Figure 1B:
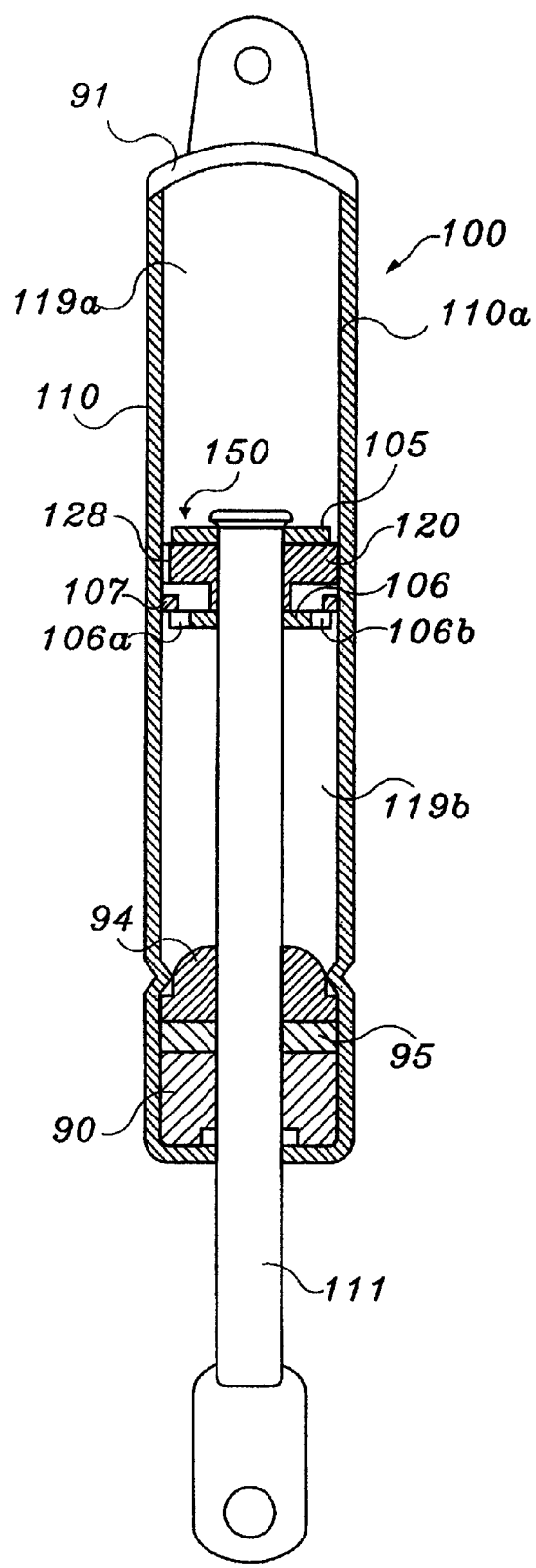
FIG. 1b is a cross-sectional view for showing the gas spring device according to the present invention after the pressure is applied to the piston rod.
Figure 2:
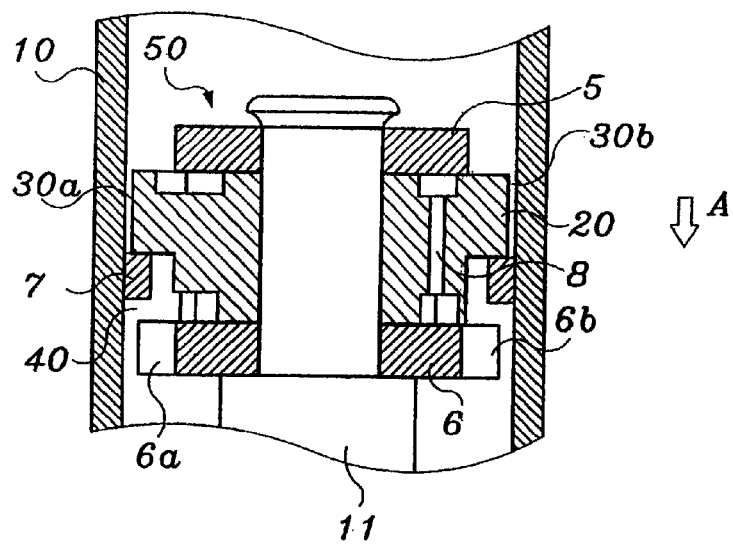
FIG. 2 is a partial cross-sectional view for showing a conventional gas spring device.
Figure 3A:
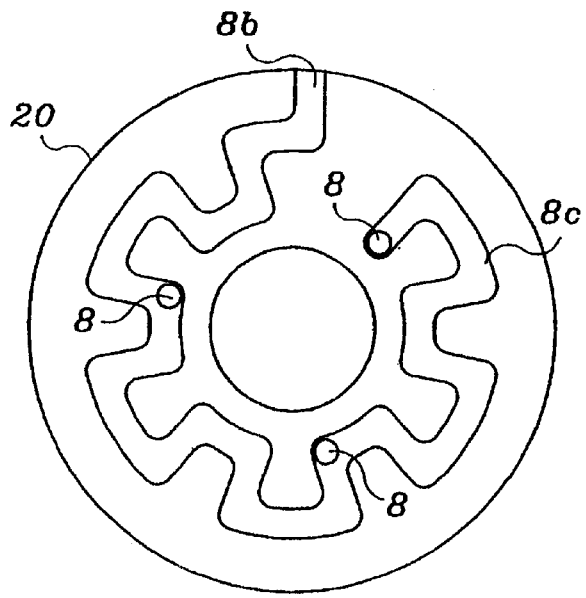
FIG. 3a is a top view for showing a conventional piston.
Figure 3B:
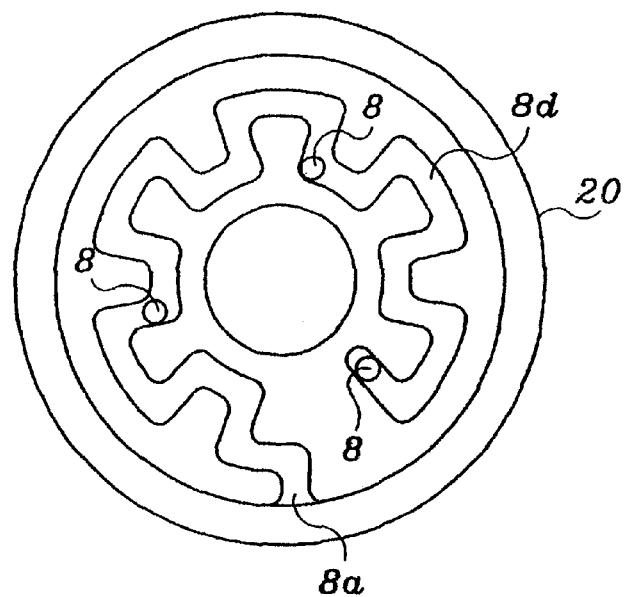
FIG. 3b is a rear view for showing the conventional piston.
Figure 4:
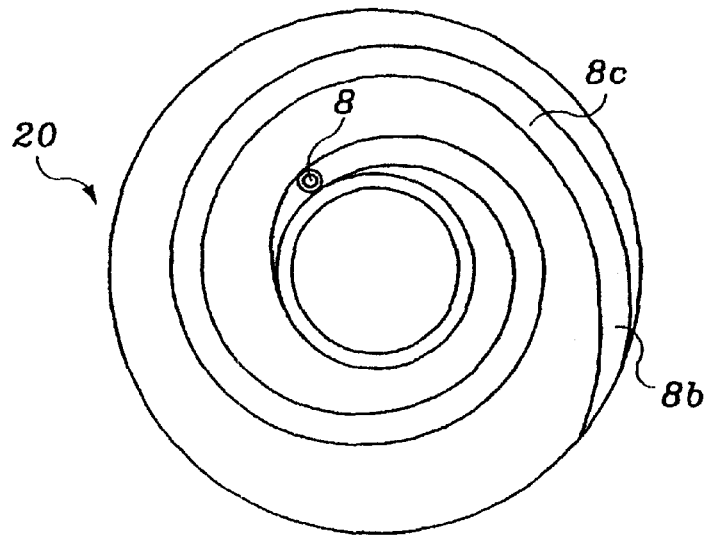
FIG. 4 is a top view for showing another example of the conventional piston.

FIG. 1a is a cross-sectional view for showing the gas spring device before a pressure is applied to a piston rod, and FIG. 1b is a cross-sectional view for showing the gas spring device according to the present invention after the pressure is applied to the piston rod.

Figure 5A:
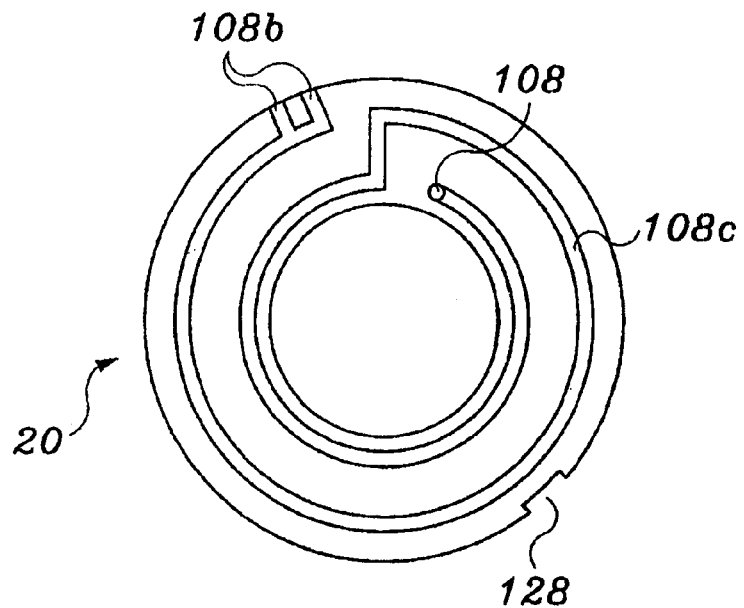
FIG. 5a is a top view for showing a piston according to the present invention.
Figure 5B:
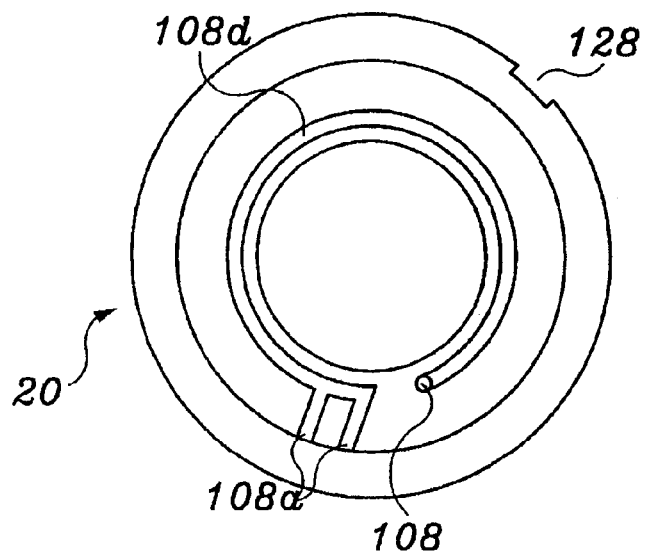
FIG. 5b is a rear view for showing the piston according to the present invention.
Figure 6A:
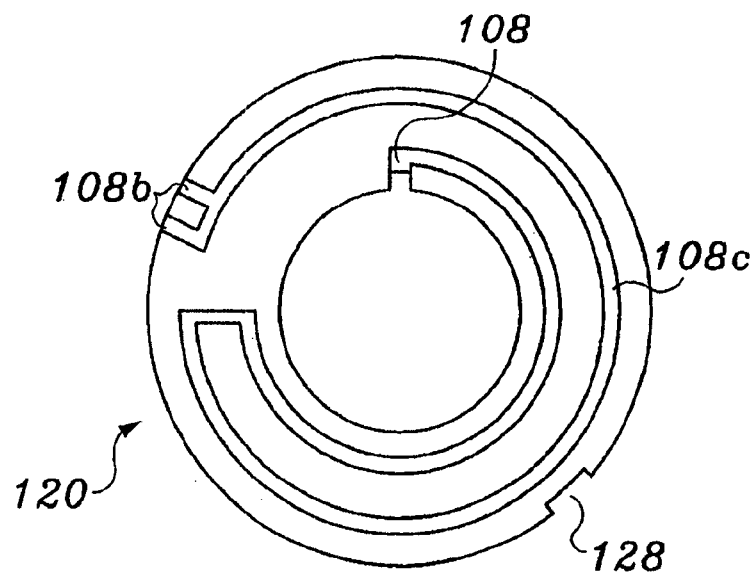
FIG. 6a is a top view for showing another example of the piston according to the present invention.
Figure 6B:
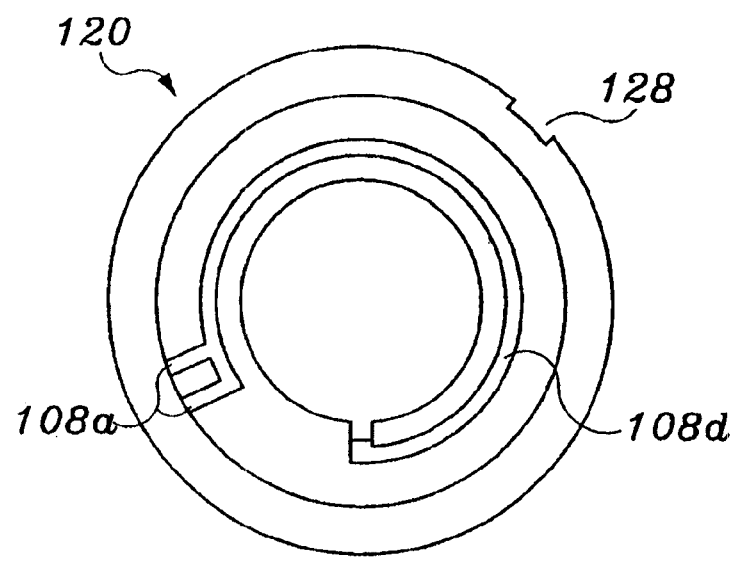
FIG. 6b is a rear view for showing another example of the piston according to the present invention.
Figure 7A:
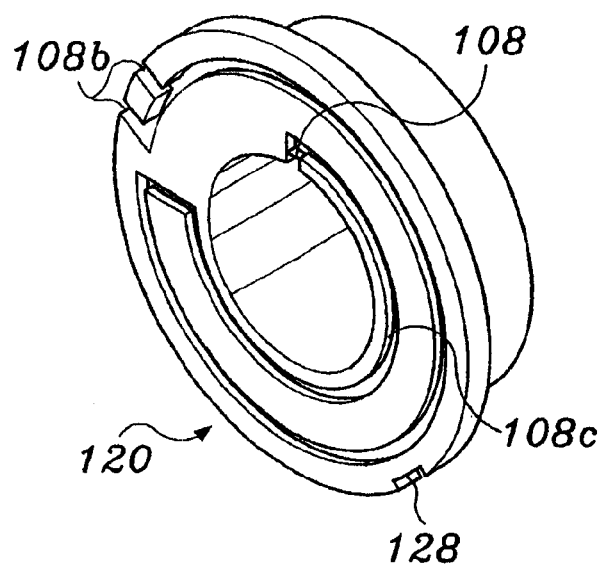
FIGS. 7a and 7b is views for showing a piston according to another example of the present invention.
Figure 7B:
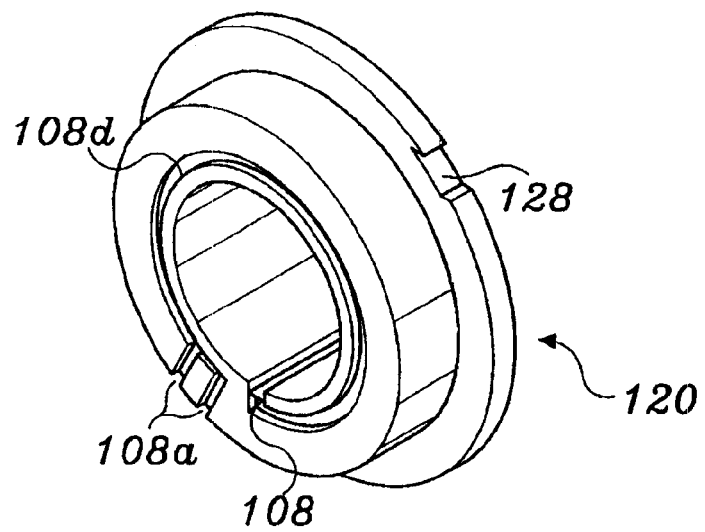
Figure 8:
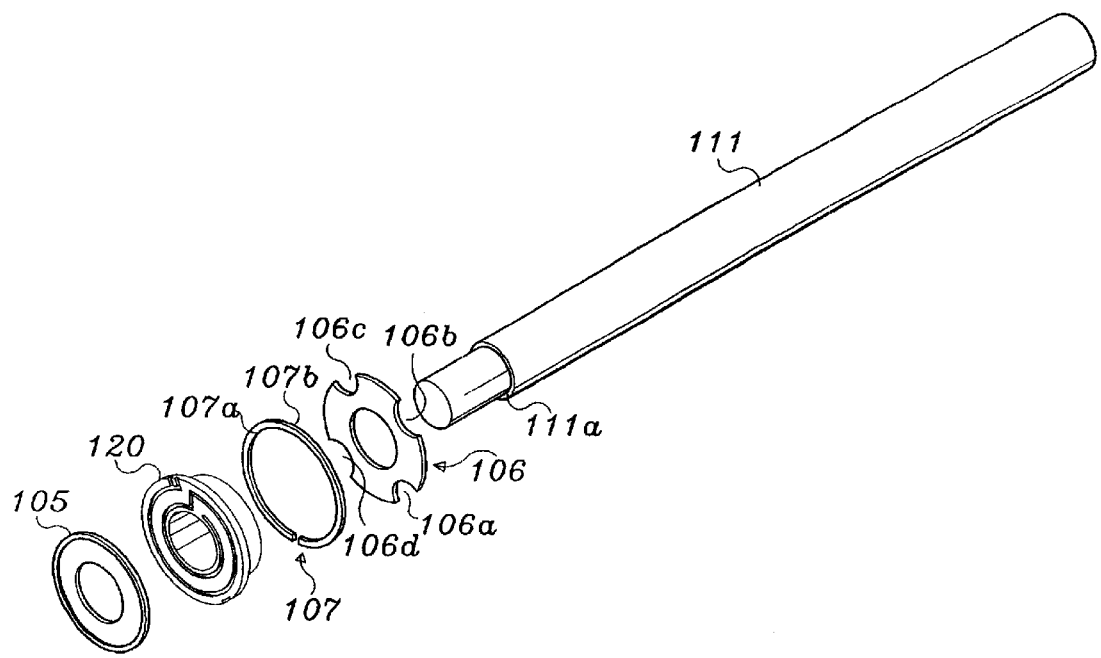
FIG. 8 is a view for showing the assembling process of a speed reducing device according to the present invention.

FIGS. 5a and 5b are a rear view and a top view for showing a piston according to a preferred embodiment of the present invention respectively, and FIGS. 6a and 6b are a rear view and a top view for showing a piston according to another preferred embodiment of the present invention. FIGS. 7a and 7b are views for showing a piston according to the preferred embodiment of the present invention viewed from another direction, and FIG. 8 is an exploded perspective view of a speed reducing device of the present invention.

The gas spring device 100 of the present invention includes a cylinder 110, a tape holder 91 which seals one end of the cylinder, a flange 90 which seals the other end of the cylinder, a gas seal 95, and an open holder 94. The gas spring device 100 includes a piston rod 111 having one end which is penetrated through the flange, the gas seal, and the open holder and is positioned in the cylinder and the other end which is located outside. The gas spring device includes a speed reducing device 150 which is penetrated through an end portion of the piston located in the interior of the piston and is fixed to the end portion of the piston rod.

The speed reducing device comprises an uneven piston 120, an upper washer 105 and an under washer which make contact with the upper and lower surfaces of the piston to sandwich the piston, a TEFLON ring 107 which is mounted to an annular ring 140 formed between the under washer and the piston. A portion of the circumference of the TEFLON ring is cut off.

The outer peripheral surface of the piston located between the upper washer 105 and the TEFLON ring 107 is tightly adhered to the inner wall surface of the cylinder, and is slidably moved along the inner wall surface of the cylinder.

A cutting recess 128 which has the thickness of the TEFLON ring 107 is formed on the outer peripheral surface of the piston adhered to the inner wall surface of the cylinder. A concentric gas passage 108c is formed on the surface of the piston which makes contact with the upper washer 105, and another concentric gas passage 108c. The inlet and outlet 108b of the gas passage is opened towards the outer peripheral surface of the piston.

A concentric gas passage 108d is formed in the surface of the piston which makes contact with the under washer 106. The inlet and outlet 108a of the gas passage is opened towards the bottom surface portion of the annular recess 140.

The gas passages 108c and 108d formed on both surface of the piston are connected by an axial recess 108 which penetrates the piston.

The gas flowed through the gas inlet and outlet 108b is flowed out towards the gas inlet and outlet along the gas passage 108c, the axial recess 108, and the gas passage 108d, the gas flowed through the gas inlet and outlet 108a is flowed towards the gas inlet and outlet 108b through the reverse direction.

The diameters of the under washer 106 and the upper washer 105 is smaller than the outer diameter of the piston adhered to the inner wall surface of the cylinder.

The outer peripheral surface 107b of the TEFLON ring 107 is adhered to the inner wall surface of the cylinder. The inner peripheral surface 107 is separated from the bottom surface of the annular recess 140 by a distance to prevent the TEFLON ring 107 from blocking the gas inlet and outlet 108a.

The inner peripheral surface 107a of the TEFLON ring is located in the middle portion of the semispherical cutting portions 106a, 106b, 106c and 106d formed along the outer peripheral surface of the under washer 106 to easily pass the gas through the cutting recess 128 of the piston 120 and the gas inlet and let 108a.

In the state in which the reducing device is constituted in the above-mentioned manner, since the interior of the cylinder has gas pressure hihg than the atomspheric pressure, the piston rod 111 which is fixed to the speed reducing device 150 by the gas pressure is pushed outside as shown in FIG. 1a.

If the piston rod 111 is pushed into the cylinder with a gas pressure higher than the gas pressure of the cylinder in the state of FIG. 1a, the speed reducing device 150 is moved towards the interior of the cylinder.

The TEFLON ring 107 is moved towards the under washer 106 by the friction with the inner wall surface 110a of the cylinder 110 to open the cutting recess 128 of the piston 120.

Since the gas of the first chamber 119a of the cylinder is relatively promptly flowed out towards the second chamber 119b of the cylinder through the cutting recess 128 and the opened gas inlet and outlet 11 8a and 118b, the piston rod 111 is pushed into the first chamber 119a at a relatively high speed.

If the exterior pressure applied to the piston rod is released in the state in which the piston rod 111 is pushed towards the first chamber 119a, the piston rod 111 is moved to the original position.

When the piston rod 111 is moved outside the cylinder, the TEFLON ring 107 of the speed reducing device 150 is moved towards the piston by the friction with the inner wall surface 110a to shield the cutting recess 128 of the piston ring.

Therefore, the gas of the second chamber 119b of the cylinder is moved only through the gas inlet and outlet 108a and 108b and the gas is not moved towards the piston cutting recess 128. Thus, the gas in the second chamber 119b is slowly moved towards the first chamber 119 of the cylinder to damp the gas flow.

To improve the damping effect of the gas flow, the gas is prevented from being flowed through the axial recess 108, and the flow speed of the gas is reduced by forming the concentric gas passages 108c and 108d on the upper and lower surfaces of the piston.

The concentric gas passage according to the present invention does not lower the damping effect compared with a curved gas passage pattern, and easily forms the pattern of the gas passage.

Further, since the outer peripheral surface of the piston is tightly adhered to the inner surface of the cylinder to slidably move in the cylinder, the shaking of the speed reducing device is not generated and the preciseness of the gas damping reaction is improved.

In the speed reducing device of the present invention, the axial recess 108 of the piston has at least one penetrating hole as shown in FIGS. 5a and 5b, or has at least one recess on the penetrating hole surface for fixing the piston rod as shown in FIGS. 6a and 6b.

The speed reducing device is assembled by inserting the under washer 106 into a jaw 111a formed at the end portion of the piston rod 111 of FIG. 8 and sequentially inserting the TEFLON ring 107, the piston 120, and the upper washer 105. The end portion of the cylinder rod protruded towards the upper washer 105 is riveted.

The TEFLON ring and the piston is made of a metal material, a nonmetal material, and a resin material.

According to the present invention, since the outer peripheral surface of the piston is adhered to the inner surface of the cylinder and the gas passage which damps the speed of the gas is concentric, the speed reducing device is not shaken in the cylinder and the preciseness of the damping effect of the gas speed is improved.

Further, if the concentric gas passage is formed by the cutting machining, the assembling effect is improved compared with the conventional curved pattern of the gas passage.

As stated above, preferred embodiments of the present invention are shown and described. Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A gas spring device which forms a chamber which is filled with a gas at a pressure higher than the atmospheric pressure by closing both ends and includes a piston rod extended towards the inside and the outside of the chamber through on of the both ends of the chamber and a speed reducing device fixed to an end of the piston rod located in the inner side of the chamber to separate the chamber into two spaces through which the filled gas is slowly moved, where the speed reducing device includes an uneven piston, an under washer and an upper washer which make contact with upper and lower surfaces of the piston and a ring mounted to an annular recess formed between the piston and the under washer and having an outer peripheral surface adhered to the inner wall surface of a cylinder and an inner peripheral surface separated from the bottom surface of the annular recess, at least one cutting recess formed on the outer peripheral surface of the piston located between the ring and the upper washer, at least one concentric speed reducing passage formed on the upper and lower surface of the piston, and at least one axial recess penetrating the piston to connect the concentric speed reducing passage of the upper and lower surfaces of the piston.

2. A gas spring device according to claim 1, wherein the piston, the upper washer, and the under washer are penetrated and fixed by the piston rod, and the axial recess is formed along a penetrating recess surface of the piston.

3. A gas spring device which forms a chamber which is filled with a gas at a pressure higher than the atmospheric pressure by closing both ends and includes a piston rod extended towards the inside and the outside of the chamber through on of the both ends of the chamber and a speed reducing device fixed to an end of the piston rod located in the inner side of the chamber to separate the chamber into two spaces through which the filled gas is slowly moved, where the speed reducing device includes an uneven piston, an under washer has having a cross shape and an upper washer which make contact with upper and lower surfaces of the piston and a ring mounted to an annular recess formed between the piston and the under washer and having an outer peripheral surface adhered to the inner wall surface of a cylinder and an inner peripheral surface separated from the bottom surface of the annular recess, at least one cutting recess formed on the outer peripheral surface of the piston located between the ring and the upper washer, at least one speed reducing passage formed on the upper and lower surface of the piston, and at least one axial recess penetrating the piston to connect the gas passage of the upper and lower surfaces of the piston.

4. A spring device according to claim 1, wherein the ring has a circular shape and a portion of the curricular shape is cut off.

5. A spring device according to claim 1, wherein the piston is comprised of one selected from a metal material, a nonmetal material, and a resin material.

6. A spring device according to claim 1, wherein the under washer has cutting portions.

7. A spring device according to claim 6, wherein the cutting portions are semispherical.

8. A spring device according to claim 7, wherein the ring is located in a middle portion of the under washer relative to the semispherical cutting portions.

9. A spring device according to claim 7, wherein the under washer includes four semispherical cutting portions.

10. A spring device according to claim 1, wherein the under washer has a cross shape.

11. A spring device according to claim 1, wherein the ring has a circular shape and a portion of the curricular shape is cut off.

12. A spring device according to claim 1, wherein an outer periphery of the piston is adhered to the inner wall surface of the cylinder.

13. A gas spring device which forms a chamber which is filled with a gas at a pressure higher than the atmospheric pressure by closing both ends and includes a piston rod extended towards the inside and the outside of the chamber through on of the both ends of the chamber and a speed reducing device fixed to an end of the piston rod located in the inner side of the chamber to separate the chamber into two spaces through which the filled gas is slowly moved, where the speed reducing device includes an uneven piston, an under washer having semispherical cut portions and an upper washer which make contact with upper and lower surfaces of the piston and a ring mounted to an annular recess formed between the piston and the under washer and having an outer peripheral surface adhered to the inner wall surface of a cylinder and an inner peripheral surface separated from the bottom surface of the annular recess, at least one cutting recess formed on the outer peripheral surface of the piston located between the ring and the upper washer, at least one speed reducing passage formed on the upper and lower surface of the piston, and at least one axial recess penetrating the piston to connect the gas passage of the upper and lower surfaces of the piston.

14. A spring device according to claim 13, wherein the outer periphery of the piston is adhered to the inner wall surface of the cylinder.

* * * * *